(12) United States Patent
Lin et al.

(10) Patent No.: US 7,532,594 B2
(45) Date of Patent: May 12, 2009

(54) METHOD AND SYSTEM OF BLUETOOTH NETWORK

(75) Inventors: Ting-Yu Lin, Hsinchu (TW); Yu-Chee Tseng, Hsinchu (TW); Keng-Ming Chang, Taipei (TW); Chun-Liang Tu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 1116 days.

(21) Appl. No.: 10/623,725

(22) Filed: Jul. 22, 2003

(65) Prior Publication Data

US 2004/0136338 A1  Jul. 15, 2004

(30) Foreign Application Priority Data

Dec. 27, 2002  (TW) .............................. 91137649 A

(51) Int. Cl.
*H04L 12/56* (2006.01)
(52) U.S. Cl. ........................ 370/329; 370/351; 370/216; 370/406
(58) Field of Classification Search ................. 370/329, 370/386, 325, 443, 406, 216, 351, 410, 389, 370/338, 349
See application file for complete search history.

(56) References Cited

U.S. PATENT DOCUMENTS

| | | | |
|---|---|---|---|
| 2002/0044549 A1* | 4/2002 | Johansson et al. ............ 370/386 |
| 2002/0061009 A1* | 5/2002 | Sorensen ..................... 370/351 |
| 2003/0063619 A1* | 4/2003 | Montano et al. ............ 370/443 |
| 2003/0117946 A1* | 6/2003 | Fontana et al. .............. 370/216 |

* cited by examiner

*Primary Examiner*—Charles N Appiah
*Assistant Examiner*—Michael T Vu
(74) *Attorney, Agent, or Firm*—Birch, Stewart, Kolasch & Birch, LLP

(57) ABSTRACT

A Bluetooth network topology. The Bluetooth network system includes a plurality of piconets, containing a plurality of Bluetooth units, including one master unit and a plurality of slave units. These piconets are linked by the bridge units to form a scatternet ring. The scatternet ring is formed by a centralized forming mechanism, operated by a simple yet efficient routing protocol and maintained by recovery and extension mechanisms.

45 Claims, 15 Drawing Sheets

METHOD AND SYSTEM OF BLUETOOTH NETWORK

BACKGROUND OF THE INVENTION

1. Field of the Invention

The present invention relates to wireless communication, and particularly to short-range Bluetooth wireless communication in a scatternet ring.

2. Description of the Related Art

Bluetooth transmission is a promising new technology for short-range connectivity between mobile devices, generally used as an economical replacement for point-to-(multi)point cables. Single chip, low-power, Bluetooth communication modules that fit inside mobile phones, laptops, palm computers, digital cameras, and cordless headsets allow users to interconnect these devices easily and quickly without the need for cables. FIG. 1 is a schematic diagram showing a Bluetooth piconet (FIG. 1a) and scatternet (FIG. 1b), respectively. Devices are organized in piconets, referred to as basic Bluetooth network units. Every piconet has a master and up to 7 slaves. A group of interconnected piconets are referred to as a scatternet. Piconet 1 comprises a master 10, a slave 11, a slave 12 and a slave 13. Multiple piconets with overlapping areas of coverage can form a scatternet. A scatternet 2 comprises a piconet 21 and a piconet 22. The piconet 21 comprises a master 210, a slave 211, a slave 212, a slave 213 and a bridge 23. The piconet 22 comprises a master 220, a slave 221, a slave 222, a slave 223 and a bridge 23. The bridge 23 participates in piconets 21 and 22 and connects the two piconets to form the scatternet 2.

Bluetooth channels use a frequency-hop/time-division-duplex (FH/TDD) scheme. The channel is divided into time intervals, each of 625-μs, referred to as slots, where a different hop frequency is used for each slot. The frequency hopping occurs 1600 times per second. Devices use a transmission pattern referred to as time division multiple access (TDMA), which allows the devices to transmit one certain packet in one slot, and transmit or receive another packet in the following slot. A packet can cover one slot, three slots or five slots. For a one-slot packet, the transmission frequency is determined in accordance with the corresponding Bluetooth clock of the slot. For a multiple-slot packet, the transmission frequency is determined in accordance with the Bluetooth clock of the first slot covered by the packet, and the transmission frequency remains unchanged throughout the transmission time of the packet.

A Bluetooth unit can be treated as a bridge by acting as slave in multiple piconets, or slave in one or more piconets and master in another piconet simultaneously. However, according to the Bluetooth specification, a Bluetooth unit cannot be a master in more than one piconet. Generally, the connection between a master and a slave is established on demand initiated from the master. The communication in a piconet is controlled by the corresponding master. Every Bluetooth unit in a piconet uses the defined frequency hopping sequence determined by the master of the piconet. Every Bluetooth unit has a clock and a globally unique 48 bit Bluetooth address, assigned in accordance with the IEEE 802 standard. The Bluetooth address is an open address code, which can be acquired manually or automatically. The baseband derives a frequency hopping sequence from the Bluetooth address and the Bluetooth clock. The master informs the slave of its address and clock when it establishes a link therewith. The slave derives the hop frequency of the master in accordance with the received information and adjusts its hop frequency accordingly to synchronize with the master. A slave is allowed to transmit in a given slot if the master has addressed it in the preceding slot.

Different types of link can be established between the master and its slave(s) under different situations. Two link types have been defined: a Synchronous Connection-Oriented (SCO) link and an Asynchronous Connection-Less (ACL) link. The SCO link is a symmetric, point-to-point link between a master and a specific slave. The SCO link reserves slots and can therefore be considered as a circuit-switched connection between the master and the slave. The SCO link typically supports time-bound information like voice. The master can support up to three SCO links to the same slave or to different slaves. The ACL link is a point-to-multipoint link between the master and all its slaves. In the slots not reserved for the SCO link(s), the master can establish an ACL link on a per-slot basis to any slave. Between a master and a slave only a single ACL link can exist. For most ACL packets, packet retransmission is applied to assure data integrity.

There are four operational modes for each Bluetooth unit: active, sniff, hold, and park modes.

In the active mode, the unit actively participates on the channel. The master of the piconet schedules the transmission based on traffic requirements to and from the slaves. A slave in the active mode is allowed to use regular transmission to stay synchronized to the channel. An active slave listens for packets at predetermined intervals. An active slave stays in the standby mode until the next scheduled master transmission. A slave stays synchronized with the master by the channel access code.

In the sniff mode, the duty cycle of a slave's listening activity is reduced. A slave using an ACL link listens for the master in every ACL slot. In this mode, the master starts transmission only in a specified periodic time slot.

In the hold mode, a Bluetooth unit transmits SOC packets but not ACL packets. The unoccupied slots can operate scanning, paging, and inquiring, or participate in another piconet. In this mode, a slave hibernates for a specified amount of time based on the negotiation between the master and the slave before entering the hold mode. The slave keeps its Active Member Address (AM_ADDR) in the hold mode and returns to active mode after the specified time period.

A slave device enters park mode when there is no current need for active participation in the piconet, and there is a need for synchronization. In the park mode, a slave abandons its AM_ADDR and adopts a Parked Member Address (PM_ADDR) and an Access Request Address (AR_ADDR). The parked slave listens periodically to the broadcast traffic on the piconet to remain synchronized. When not listening, the slave enters low power mode to reduce power consumption.

Using park mode also increases the theoretical number of possible slaves from 7 to 4096. As mentioned above, units are organized in piconets, each of which has one master and up to seven active slaves. A unit can be a slave in two or more piconets and master in another piconet, but cannot be a master in more than one piconet. A unit participating in more than one piconet is referred to as a bridge. Piconets are interconnected via bridge nodes to form a wider network known as a scatternet. Multiple piconets can co-exist in a common area because each uses a different hopping sequence.

The unit stays in standby mode and continues listening to remote call messages before it interconnects with another Bluetooth unit.

In the Bluetooth wireless specification, the structure of scatternet has not been established, since protocols for interpiconet communication among units in a scatternet have not yet been defined. A plausible solution is to model a scatternet as an instance of an ad hoc network and use already known methods of routing. While this approach is certainly feasible, it is not an efficient solution. The Bluetooth layer presents a unique set of features and limitations for which known ad hoc routing protocols are not optimized.

Hence, there is a need for simple and efficient scatternet topologies with well supports of routing protocols.

SUMMARY OF THE INVENTION

Accordingly, an object of the invention is to provide a scatternet topology enabling efficient packet transmission in a Bluetooth network.

Another object of the invention is to provide a scatternet routing method enabling easy maintenance of a Bluetooth network.

Another object of the invention is to provide a network recovery method enabling quick recovery of a Bluetooth network when failure occurs.

To achieve the above objects, the present invention provides a Bluetooth network system comprising a plurality of piconets arranged in a circle. Each piconet comprises a plurality of Bluetooth units, each of which includes one master unit and a plurality of slave units. Some of the slave units act as bridges interconnecting the piconets to form a scatternet ring. The piconet comprises at least a master unit, a downstream bridge, and an upstream bridge. The scatternet ring is a single-ring Bluetooth network formed by a centralized formation mechanism.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Next, with reference to the accompanying drawings, an embodiment of the present invention is described.

The present invention provides a Bluetooth network (referred to herein as a scatternet ring), which comprises a plurality of piconets arranged in a circle.

Figure 1:
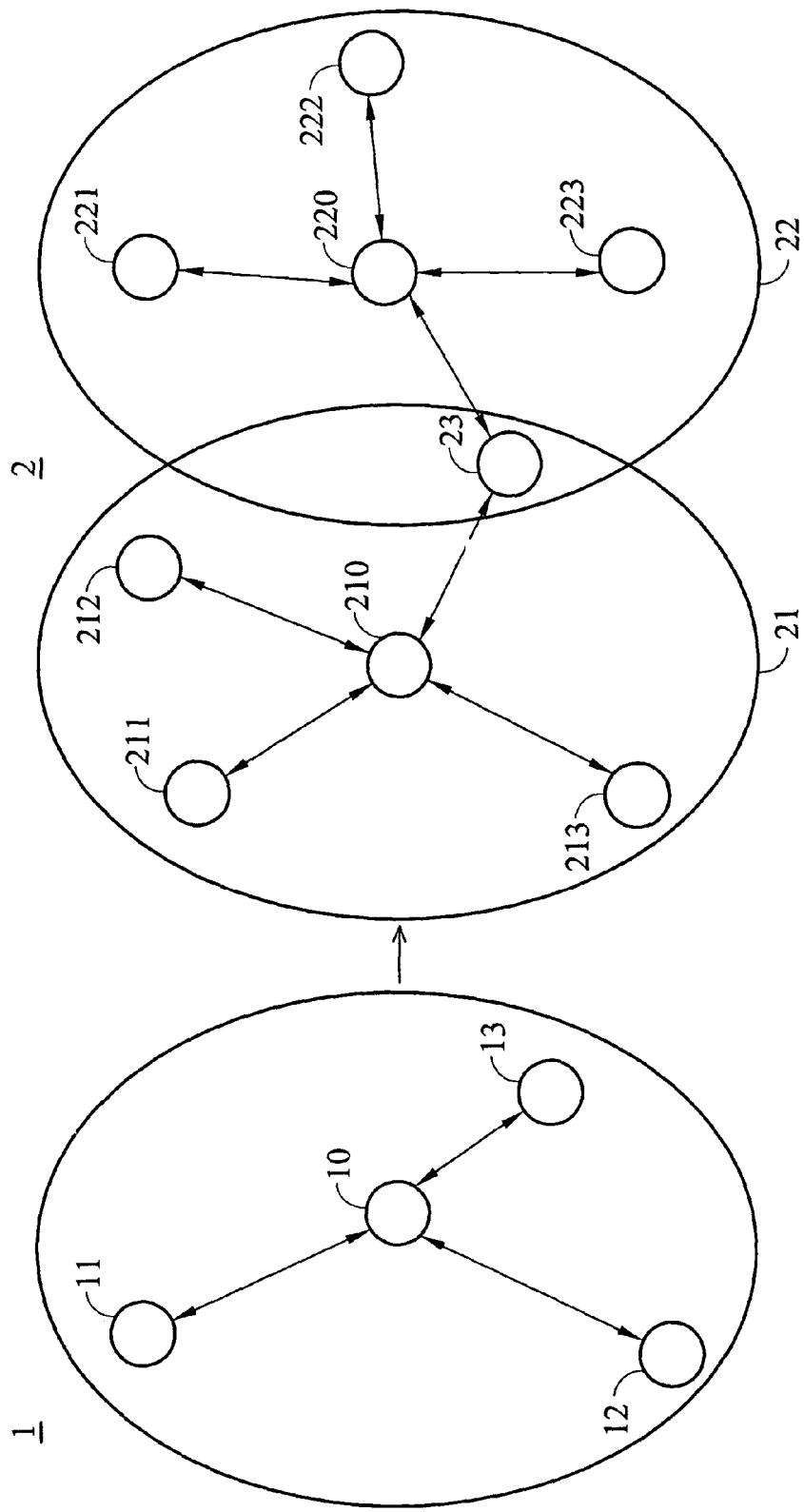
FIG. 1 is a schematic diagram of a conventional Bluetooth communication system as referenced in the Prior Art.
Figure 2:
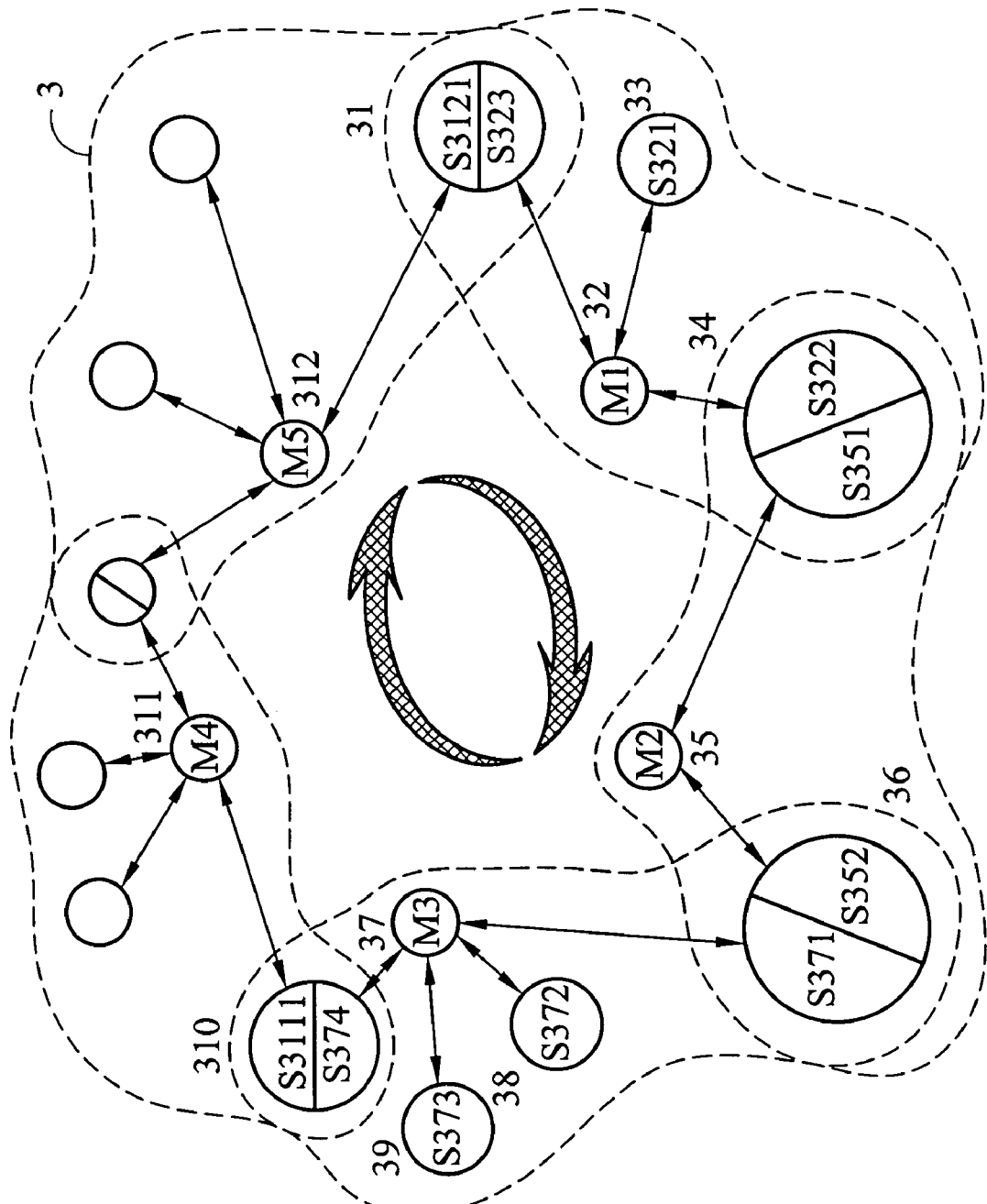
FIG. 2 is a schematic view of the scatternet system of the invention.

FIG. 2 is a schematic view of the scatternet system of the invention. A scatternet ring 3 comprises nodes 31 to 39, 310, 311, and 312.

The node 31 acts as a slave of a master M1 and a Master M5 respectively, and a bridge of the two masters. The node 31 connects with the master M1 and plays the role of slave S323; it also connects with the master M5 and plays the role of slave S3121.

The node 32 acts as the master M1.

The node 33 acts as a slave S321 of the master M1.

The node 34 acts as a slave of the master M1 and a master M2 respectively, and a bridge of the two masters. The node 34 connects with the master M1 and plays the role of slave S322; it also connects with the master M2 and plays the role of slave S351.

The node 35 acts as the master M2.

The node 36 acts as a slave of the master M2 and a master M3 respectively, and a bridge of the two masters.

The node 36 connects with the master M2 and plays the role of slave S352; it also connects with the master M3 and plays the role of slave S371.

The node 37 acts as the master M3.

The node 38 connects with the master M3 and plays the role of slave S372.

The node 39 connects with the master M3 and plays the role of slave S373.

The node 310 acts as a slave of the master M3 and a master M4 respectively, and a bridge of the two masters. The node 310 connects with the master M3 and plays the role of slave S374; it also connects with the master M4 and plays the role of slave S3111.

The node 311 acts as the master M4.

The node 312 acts as the master M5.

Figure 3:
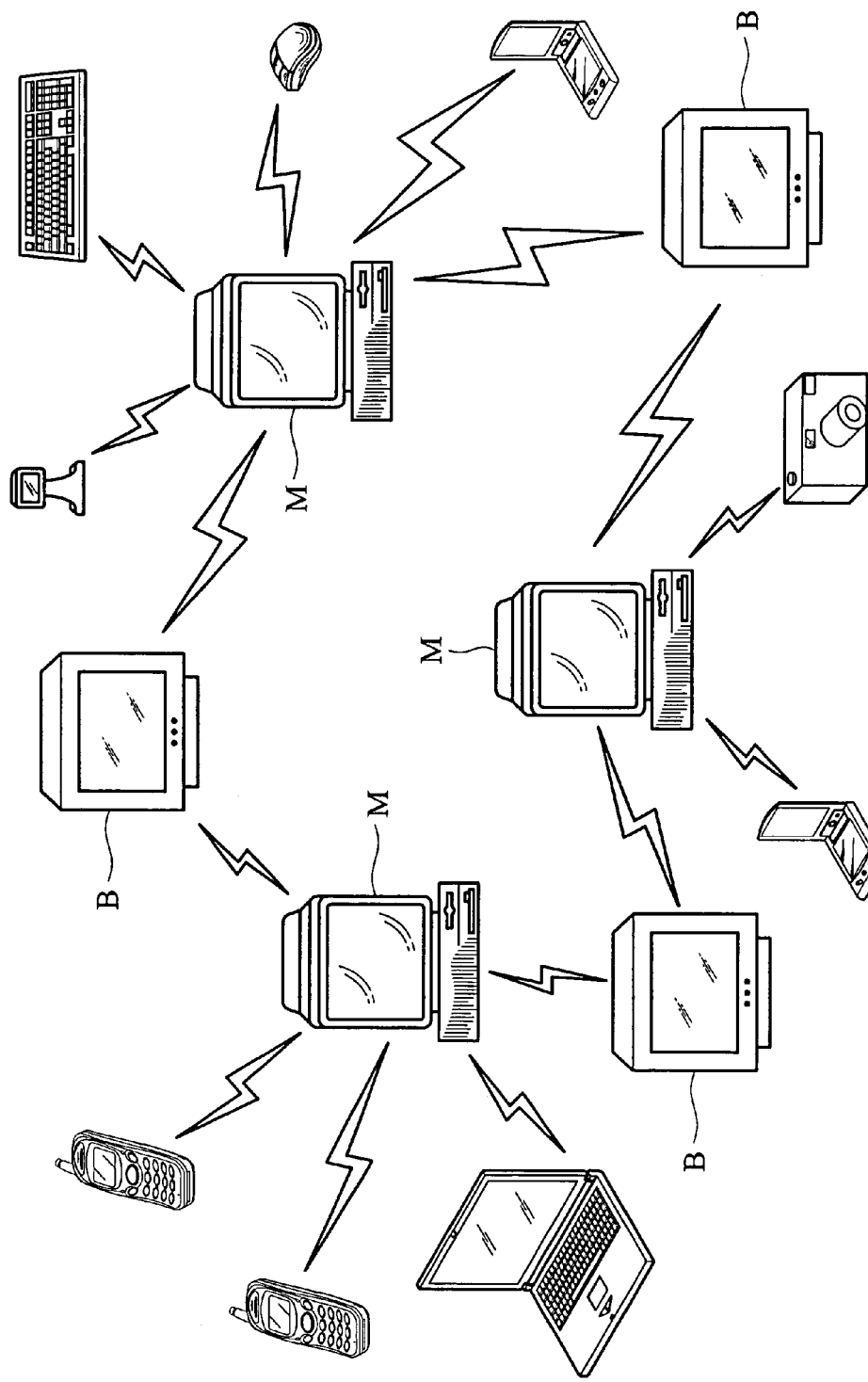
FIG. 3 is an embodiment of the scatternet ring of the invention.

The physically non-directional scatternet ring is imposed in one direction in the invention, for example, clockwise, as shown in FIG. 2 by an arrow. Thus every piconet has a downstream piconet in its clockwise direction, and an upstream piconet in its counter-clockwise direction. Nodes in a scatternet ring forward packets to respective destinations in the imposed direction of the scatternet ring. Every piconet has two slaves acting as bridges. One bridge, referred to as an upstream bridge, relays packets from upstream piconets. The other bridge, referred to as a downstream bridge, relays packets to downstream piconets. The nodes 34 and 36 are upstream and downstream bridges of the master M2 respectively. Similarly, every bridge has an upstream master and a downstream master. Thus, every bridge node serves as an upstream bridge in one piconet and a downstream bridge in another piconet. Each piconet has at least two slaves. FIG. 3 is an embodiment of the scatternet ring of the invention, wherein a computer and a TV set act as a master M and a bridge B respectively.

A scatternet ring is constructed in accordance with a centralized formation mechanism described in "T. Salonidis, P. Bhagwat, L. Tassiulas, and R LaMaire, Distributed Topology Construction of wireless Personal Area Networks. IEEE INFOCOM, 2001". All nodes in a scatternet ring are assumed to be within communication range of each other. A RING_MEM parameter is defined for every node to specify the scatternet ring membership. A node is a member of a scatternet ring if it has a RING_MEM parameter equal to 1. A node is not a member of a scatternet ring if it has a RING_MEM equal to 0. The default value of the RING_MEM parameter is 0. The scatternet ring construction has two stages.

In the first stage, the leader of the scatternet ring is elected. First, a Bluetooth device chooses to execute an inquiry (I) procedure with probability p or an inquiry scan (IS) procedure with probability (1-p). If the device chooses the inquiry scan procedure, it listens for and responds to inquiry messages. If the device chooses the inquiry procedure, it sends out inquiry messages, discovers which other devices are within range, and collects the Bluetooth addresses and clocks of all units that respond to the inquiry messages. Then the discovery device makes connection with the discovered units to form a temporary piconet. Three parameters are exchanged between members of the temporary piconet: RING_MEM, number of discovered Bluetooth units, and BD_ADDR. Then the leader of the scatternet ring is elected in accordance with these parameters. First, the RING_MEMs are compared. The unit with RING_MEM equal to 1 is elected in this comparison. Thus if unit A with a RING_MEM equal to 1 is compared to unit B with a RING_MEM equal to 0, then unit A is elected. If both compared units have a RING_MEM equal to 1, then the one with a larger number of discovered units is elected. If the compared units have an equal number of discovered units, then the one with a larger BD_ADDR is elected. Every non-elected unit provides the Bluetooth addresses and clocks gathered in the preceding inquiry procedure to the elected unit. The temporary piconet is torn down when the information transmission described above is accomplished. The elected unit is the leader of the scatternet ring if no further I/IS messages reach the elected unit within an inquiry timeout (IT). Then the leader establishes connection with other non-leader devices through a paging procedure, and the non-leader devices enter a page scan substate listening for page messages.

In the second stage, the leader designates a plurality of devices as piconet masters. The leader establishes temporary connection with these devices and provides them with information of their allocated slave devices. The leader also assigns each piconet an upstream bridge and a downstream bridge. Each assigned master uses the received information to establish connection with its slaves to form a piconet. Each assigned bridge establishes connection with its upstream master and downstream master. The RING_MEM of each device participating in the scatternet ring is reset to 1.

The present invention provides a routing protocol enabling unicasting and broadcasting over scatternet ring. A route discovery process is not required because all packets are transmitted in the direction of the scatternet ring. Unlike most conventional routing protocols for ad hoc networking, routing in scatternet ring does not depend on routing tables. If connections are based on tables at the relays, protocols must construct the table entries and delete these entries when the connection is completed or disrupted by failure or motion. No such action is necessary in the scatternet ring routing, because all packets routed in the direction of the scatternet ring ultimately reach their destination.

Figure 4:
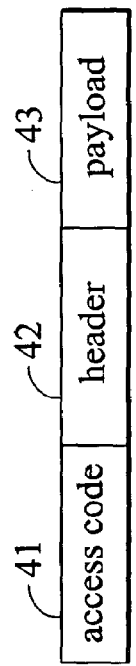
FIG. 4 illustrates the format of a packet used at baseband level according to an embodiment of the present invention.

FIG. 4 illustrates the format of a packet used at a baseband level. Each packet has three entities: an access code 41, a header 42 and a payload 43. The access code 41 and the header 42 are of fixed size, at 72 bits and 54 bits respectively. The payload 43 ranges from 0 to a maximum 2745 bits. Each packet starts with an access code 41, used for synchronization. The access code 41 identifies all packets exchanged on the channel of the piconet, and all packets sent in the same piconet are preceded by the same channel access code. In the case of pure (Asynchronous) data, only packet types DM and DH are used, and can have different lengths. Type DM1/DH1 packets cover a single time slot. Type DM3/DH3 packets cover 3 time slots. Type DM5/DH5 packets cover 5 time slots. In the payload field, two types of packets are supported: the synchronous (voice) packet and the asynchronous (data) packet. Only data packets have a payload header. The single-slot and multi-slot data packets have different payload headers.

Figure 5:
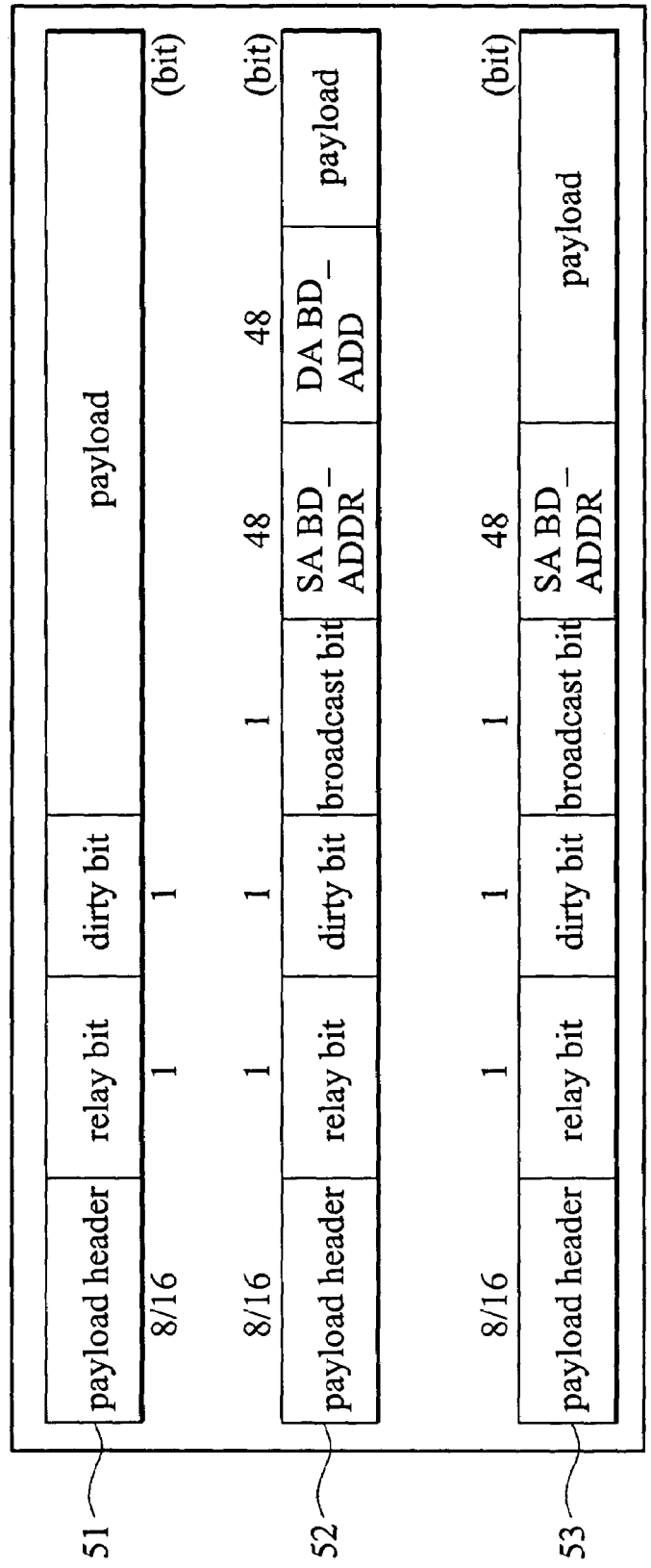
FIG. 5 illustrates the formats of payload headers according to an embodiment of the present invention.

FIG. 5 illustrates the formats of payload headers. A plurality of control bits are appended after the payload header for packet routing in the scatternet ring. There are three formats for the payload field in scatternet ring, depending on communication type. Payload formats 51, 52 and 53 are used in single-hop unicasting, multi-hop unicasting, and scatternet broadcasting respectively.

A broadcast bit is a control bit appended to distinguish broadcast packets from unicast ones. A broadcast bit is set to TRUE (1) to indicate that the packet is assigned to broadcast over the scatternet ring. The broadcast bit showing FALSE (0) indicates the packet is not a broadcast packet.

A relay bit is a control bit appended to distinguish single-hop unicasting and multi-hop unicasting. The relay bit is set to FALSE (0) in a single-hop unicasting packet, which means that no relay is needed to transmit the packet to its destination. The relay bit is set to TRUE (1) in a multi-hop unicasting packet, which means that the packet needs to be relayed to reach its destination. A packet with a TRUE relay bit is relayed along the scatternet ring until received by the master of the destination piconet. The master accepts the packet if it is the destination device. Otherwise the master resets the relay bit to 0 and forwards the packet to the destination slave device within the piconet. A slave device accepts the packet with a FALSE relay bit.

In scatternet broadcasting, the way is different for master and slave source nodes.

A master source node assigns a broadcast packet a FALSE relay bit and transmits the packet to these slaves of the master. All slaves within the piconet accept the broadcast packet. The slave acts as the downstream bridge of the piconet, examining the packet content to determine action. If the packet is a relay broadcast packet, the downstream bridge reassigns the packet a TRUE relay bit and forwards it to a corresponding downstream master. The downstream master reassigns the broadcast packet a FALSE relay bit and transmits the packet to the slaves of the downstream master. This procedure is repeated to broadcast the packet over the scatternet ring.

Because there is no direct communication between slaves, if the source node is a slave, it assigns the broadcast packet a TRUE relay bit and transmits the packet to its master for broadcasting.

A dirty bit is a control bit appended to indicate the routing history of a packet. The dirty bit is set to FALSE (0) in a single-hop unicasting packet. If both the relay and dirty bits of an arriving packet have a FALSE value, the receiving node considers the packet as coming directly from its source node.

In cases of multi-hop unicasting and broadcasting, the dirty bit prevents a packet from endlessly circulating over the scatternet ring. A slave source node sets a multi-hop unicasting or broadcasting packet a FALSE (0) dirty bit and sends the packet to a corresponding master. The master receives the packet, resets the dirty bit to TRUE (1) and forwards the packet. A master source node sets a multi-hop unicasting or broadcasting packet a TRUE dirty bit and sends the packet to the destination device(s). A receiving node uses the dirty bit and the BD_ADDR to determine whether the packet has been routing through the scatternet ring. If the packet has traveled around the scatternet ring, the receiver discards it.

The packet format 52 comprises a SA entity, a 48-bit source BD_ADDR, and a DA entity, a 48-bit destination DB_ADDR (Device ADDRess). The SA and DA entities indicate the addresses of the source and destination devices of the packet respectively. The packet format 53 comprises a 48-bit source BD_ADDR to indicate the address of the source device of the packet.

Figure 6:
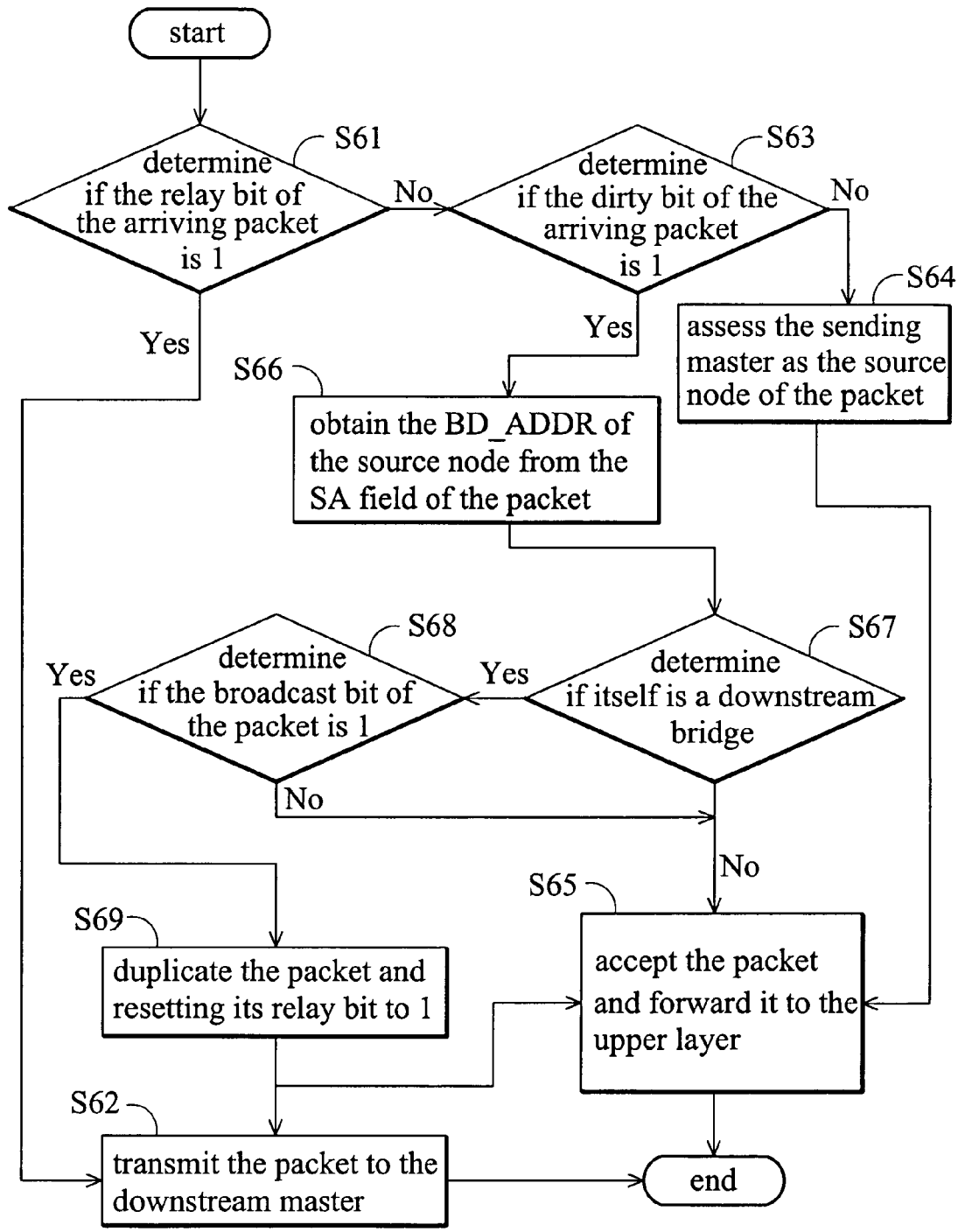
FIG. 6 is a flowchart showing the routing operation implemented by a scatternet ring slave node receiving a packet according to an embodiment of the present invention.

FIG. 6 is a flowchart showing the routing operation implemented by a scatternet ring slave node receiving a packet.

In step 61 it is determined if the relay bit of the arriving packet equals 1, and if so, the process proceeds to step 62, otherwise the process proceeds to step 63.

In step 62 the packet is transmitted to the corresponding master.

In step 63 it is determined if the dirty bit of the arriving packet equals 1, and if so, the process proceeds to step 66, otherwise the process proceeds to step 64.

In step 64 the issuing master is assessed as the source node of the packet.

In step 65 the header of the packet is stripped and the payload is forwarded to the upper layer.

In step 66 the SA field of the packet is checked and the node corresponding to the recorded BD_ADDR is assessed as the source node of the packet.

In step 67 it is determined if the receiver is a downstream bridge, and if so, the process proceeds to step 68, otherwise the process proceeds to step 65.

In step 68 it is determined if the broadcast bit of the packet is 1, and if so, the process proceeds to step 69, otherwise the process proceeds to step 65.

In step 69 the packet is duplicated and its relay bit is reset to 1. The process then proceeds to steps 65 and 62 to process the duplicates respectively.

Figure 7A:
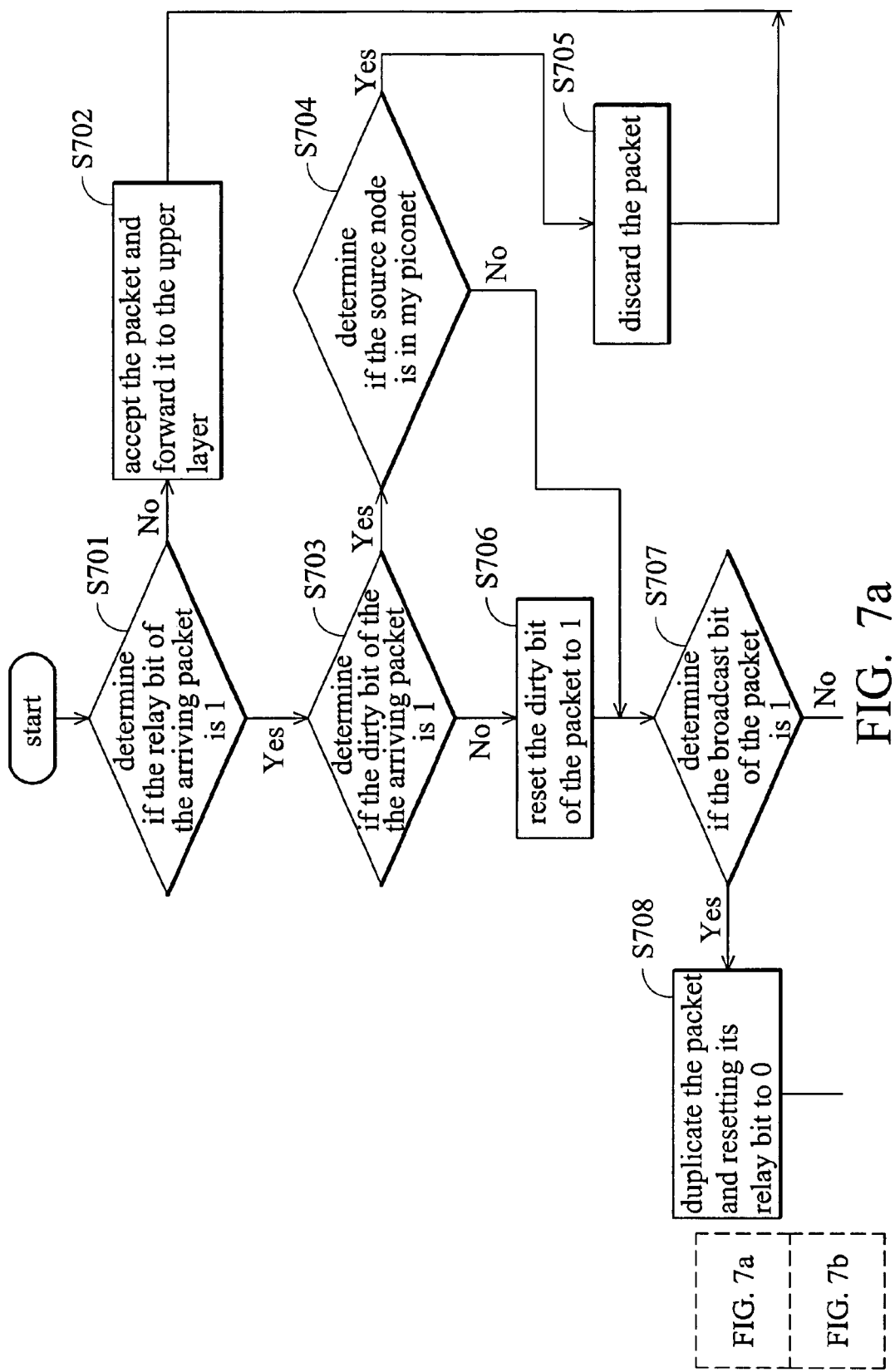
FIGS. 7a and 7b are flowcharts showing the routing operation implemented by a scatternet ring master according to an embodiment of the present invention.
Figure 7B:
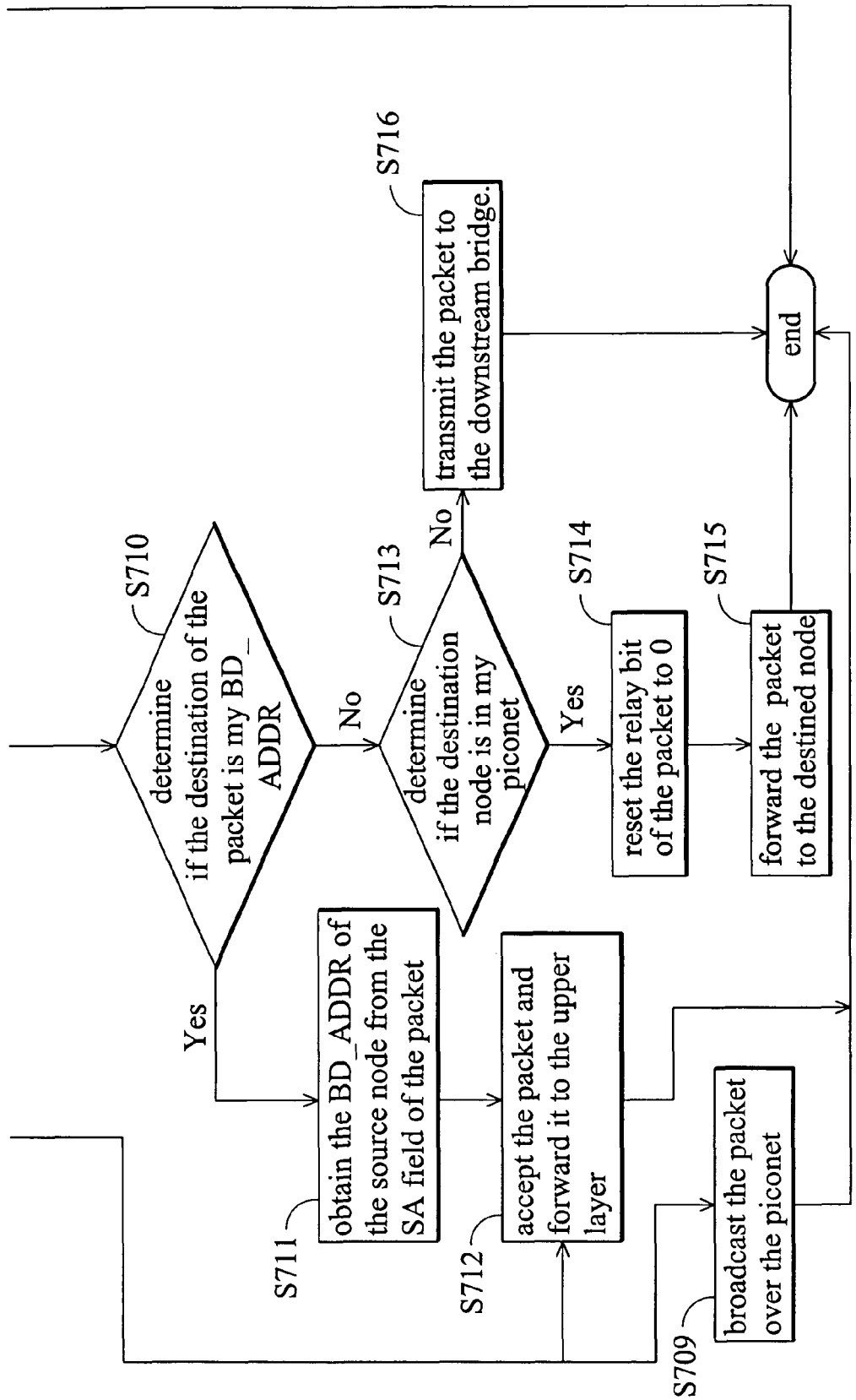

FIGS. 7a and 7b are flowcharts showing the routing operation implemented by a scatternet ring master.

In step 701 it is determined if the relay bit of the arriving packet equals 1, and if so, the process proceeds to step 703, otherwise the process proceeds to step 702.

In step 702 the header of the packet is stripped and the payload is forwarded to the upper layer.

In step 703 it is determined if the dirty bit of the arriving packet equals 1, and if so, the process proceeds to step 704, otherwise the process proceeds to step 706.

In step 704 it is determined if the source node is in the current piconet, and if so, the process proceeds to step 705, otherwise the process proceeds to step 707.

In step 705 the packet is assessed as either an orphan packet or an excess circulated packet and is discarded.

In step 706 the dirty bit of the packet is reset to 1.

In step 707 it is determined if the broadcast bit of the packet is 1, and if so, the process proceeds to step 708, otherwise the process proceeds to step 710.

In step 708 the packet is duplicated and its relay bit reset to 1. The process then proceeds to steps 712 and 709 to process the duplicates respectively.

In step 709 the packet is broadcast over the piconet.

In step 710 it is determined if the destination of the packet is the receiving master.

In step 711 the SA field of the packet is checked and the node corresponding to the recorded BD_ADDR is assessed as the source node of the packet.

In step 712 the header of the packet is stripped and the payload is forwarded to the upper layer.

In step 713 it is determined if the destination node is in the current piconet, and if so, the process proceeds to step 714, otherwise the process proceeds to step 716.

In step 714 the relay bit of the packet is reset to 0.

In step 715 the packet is forwarded to its destination node.

In step 716 the packet is transmitted to the downstream bridge.

Figure 8A:
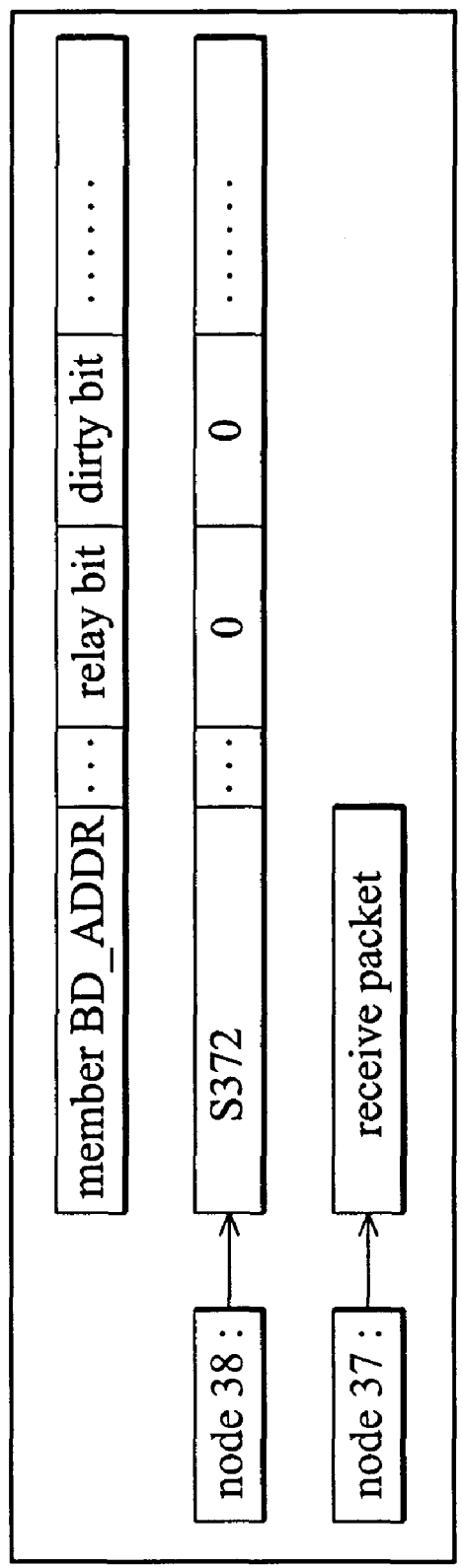
FIG. 8a is a schematic view of packet processing for a intra-piconet single-hop unicast communication according to an embodiment of the present invention.
Figure 8B:
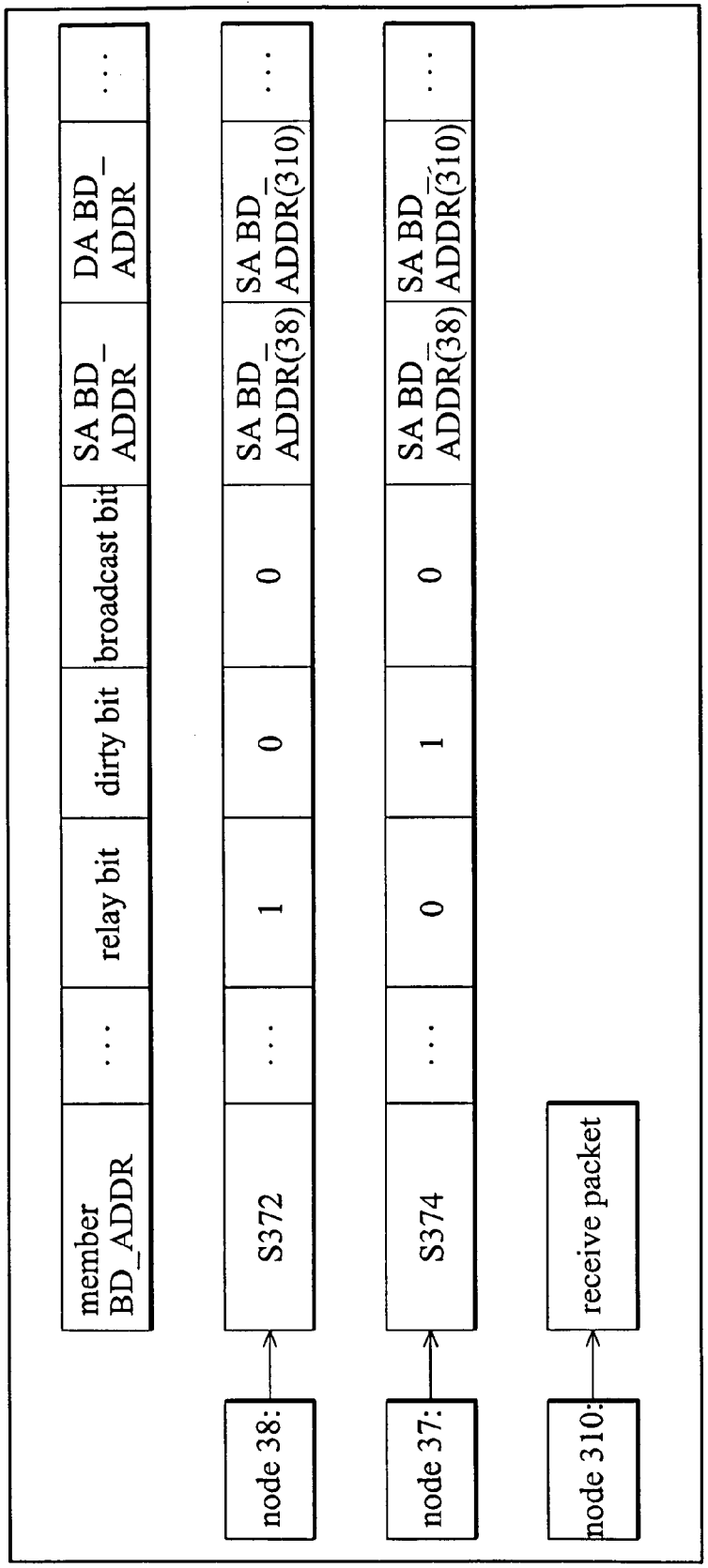
FIG. 8b is a schematic view of packet processing for a intra-piconet two-hop unicast communication according to an embodiment of the present invention.
Figure 8C:
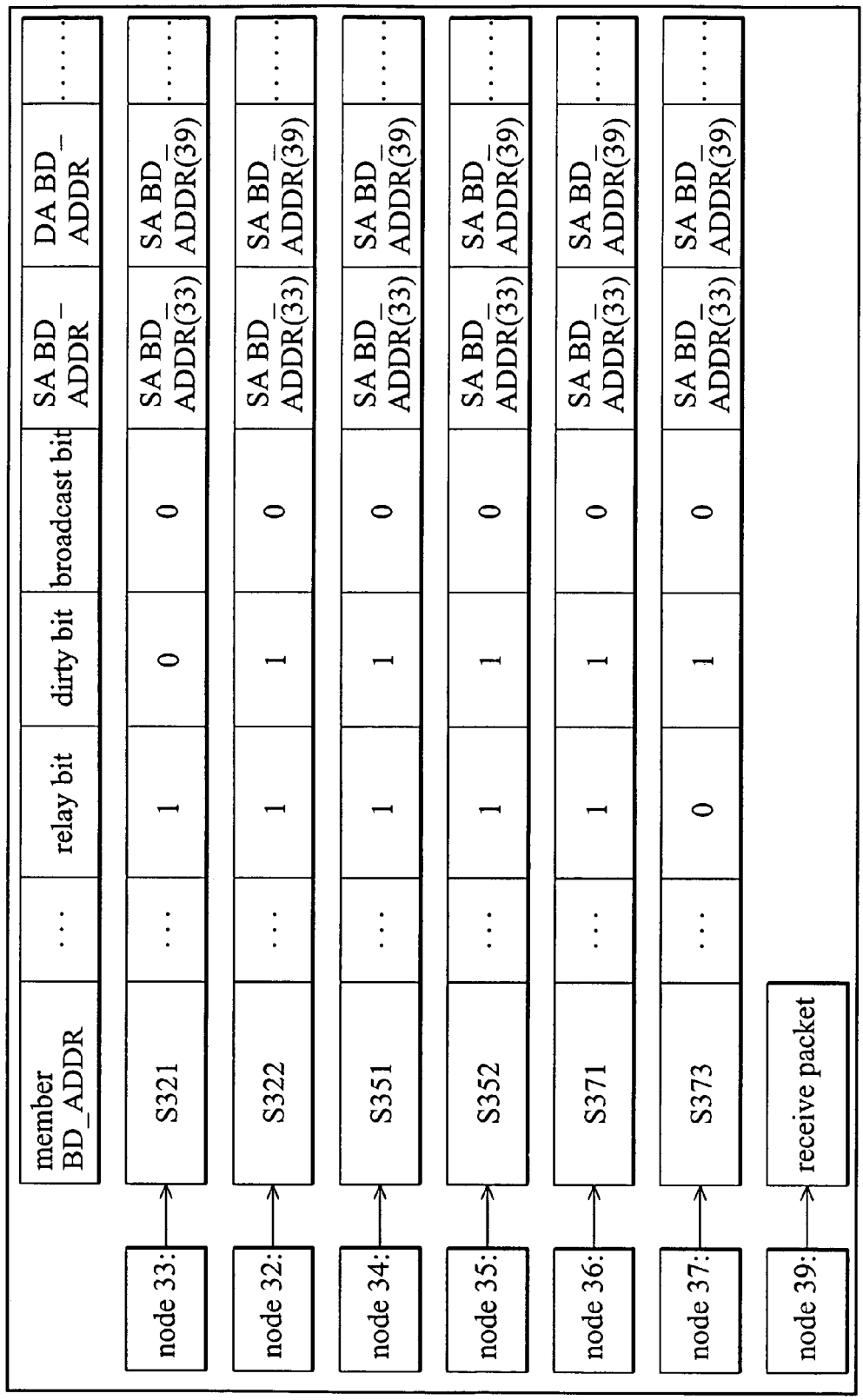
FIG. 8c is a schematic view of packet processing for a inter-piconet multi-hop unicast communication according to an embodiment of the present invention.
Figure 8D:
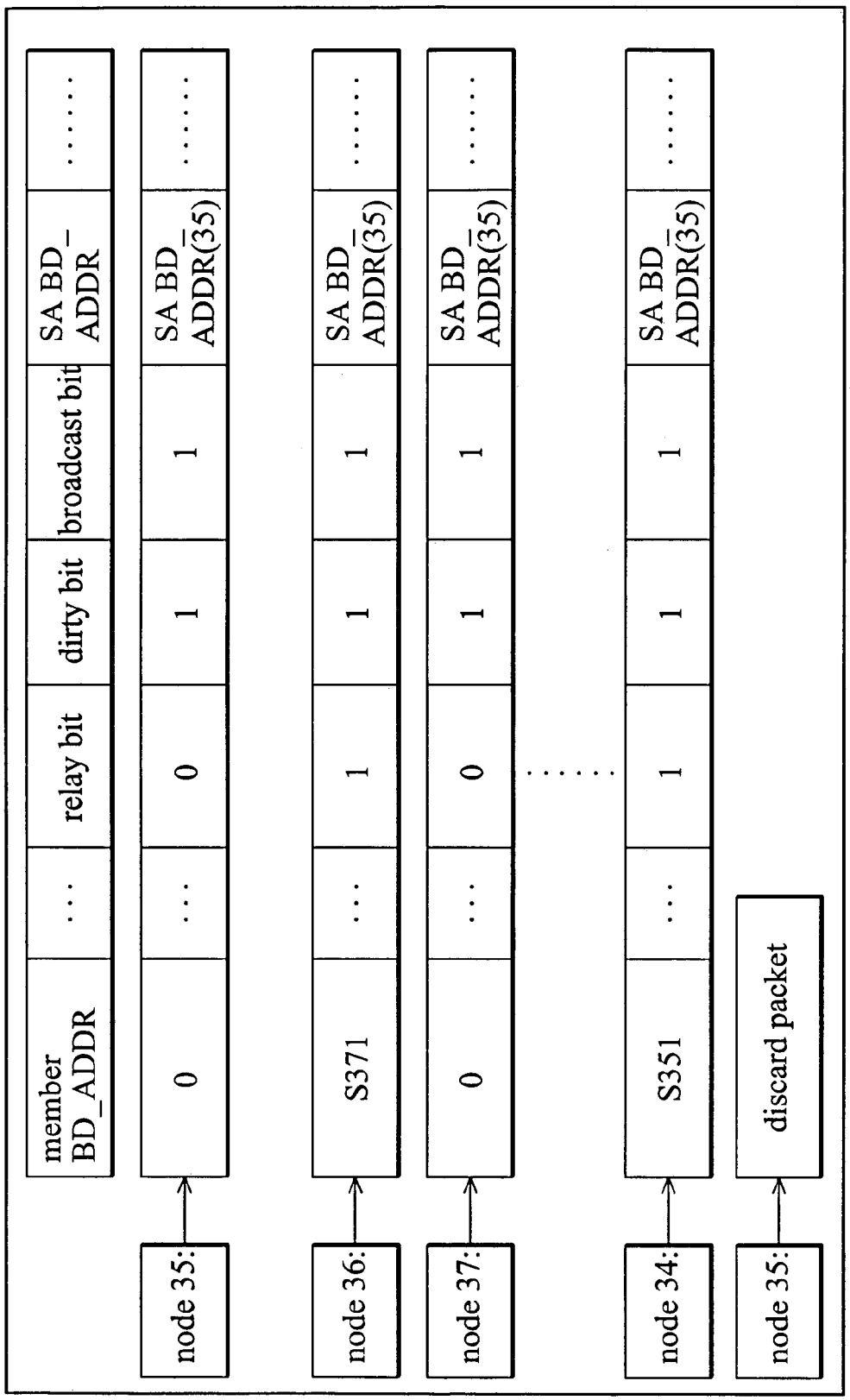
FIG. 8d is a schematic view of packet processing for scatternet broadcast communication according to an embodiment of the present invention.

FIGS. 8a to 8d are schematic views of packet processing for intra-piconet and inter-piconet communication. As illustrated in FIG. 8a, a single-hop unicast packet is transmitted from the node 38 to the node 37 in the piconet M3. FIGS. 8b and 8c are schematic views of packet processing for a multi-hop unicast communication. As shown in FIG. 8b, a multi-hop unicast packet is transmitted from the node 38 to the node 310 in the piconet M3 through intra-piconet communication. As shown in FIG. 8c, a multi-hop unicast packet is transmitted from the node 33 of the piconet M1 to the node 39 of the piconet M3 through inter-piconet communication. As shown in FIG. 8d, a scatternet broadcast packet originating at the node 35 (master M2) is broadcast to all nodes in the scatternet ring.

As mentioned above, a Bluetooth device can take four modes during the connection state: active mode, sniff mode, hold mode, and park mode. Except the active mode, the other three modes enable the device to temporarily pause its activity. A bridge node forwards data from one piconet to another by switching between the two piconets in a time division manner. Time multiplexing must be used to switch between piconets. In cases of ACL links, a unit requests to enter hold or park mode in the current piconet during which time it may join another piconet by simply changing the channel parameters. If SCO links are established, other piconets can only be visited in the non-reserved slots in between. Among the three low-power modes, the park mode is used as bridging mechanism for the proposed scatternet ring. A device stays in the park mode until it receives an unpark request, either master-activated or slave-activated.

The bridging mechanism in the scatternet ring is based on a threshold-based strategy. The default piconet of a bridge is the upstream piconet. A bridge switches to its downstream piconet under certain conditions, determined in accordance with three parameters. These parameters are: a bridge queue parameter ($T_b$), a master queue parameter ($T_m$), and a timeout parameter ($T_{out}$). The bridge and master queue parameters are threshold values to evaluate the queued packets in a bridge and a master respectively. The timeout parameter indicates a maximum time period between two switches.

A bridge switches from an upstream piconet to a downstream piconet under two conditions. In one condition, the number of queued packets to be relayed exceeds $T_b$. In the other condition, the clock $T_{out}$ expires. Under these conditions, the bridge sends a park request to its upstream master and an unpark request to its downstream master respectively.

A bridge switches from a downstream piconet to an upstream piconet under two conditions. In one condition, the bridge has transmitted all the queued packets to its downstream master. In the other condition, the queued packets of the upstream master exceed $T_m$. In the former condition, the bridge sends an unpark request to its upstream master and returns to the upstream piconet. In the latter condition, the upstream master sends an unpark request to the bridge. A bridge called by its upstream master switches from its current piconet to the upstream piconet immediately.

The ring breaks and is reduced to a linear path when any master or bridge leaves the network. The scatternet ring provides remedy and recovery mechanisms to deal with single-point and multi-point failures respectively.

In the case of a single-point failure, one node acting as a master or a bridge disconnects from others. Because of the default routing direction over the scatternet ring, a packet from a downstream piconet cannot reach its destination upstream piconet. Thus a direction bit is appended to the payload header to solve this problem.

The direction bit of a packet is set to 0 by default to indicate a forward routing direction. When a master or a bridge discovers that the downstream master or bridge has been disconnected, it resets the direction bit of the packet to 1 and relays the packet backwards.

The packet with a TRUE direction bit returns to its source piconet in its backward routing. As mentioned above, when the packet starts its routing, the dirty bit of the packet is set to 1 by the master in the source piconet of the packet. When the packet returns to the source piconet, it is discarded erroneously by the master because of its TRUE dirty bit. To avoid this mistake, a specific orphan packet criterion is proposed for these backward routing packets. In this case, the master of the source piconet transmits the packet having a TRUE value in both dirty bit and direction bit to the consecutive upstream piconet. When a packet with a TRUE direction bit reaches the upstream-most piconet in a broken scatternet ring, it is determined whether the packet is targeted to the current piconet, and if so, the packet is accepted by the master of the current piconet, otherwise it is discarded by the master of the current piconet.

The above mentioned protocol enables packet routing in a broken ring, but it leaves the broken point unfixed. The recovery mechanism enables the network to reconnect as a ring. It also enables a new Bluetooth device to join the scatternet ring arbitrarily. The scatternet ring can work properly unless multiple critical points fail at the same time.

There is one GIAC (General Inquiry Access Code) for general inquiry operations and 63 DIACs (Dedicated Inquiry Access Codes) for dedicated inquiry operations. The scatternet ring uses two of the reserved DIACs (DIAC 1 and DIAC 2) to recover the scatternet ring and GIAC to invite new device to join an existing scatternet ring.

Figure 9A:
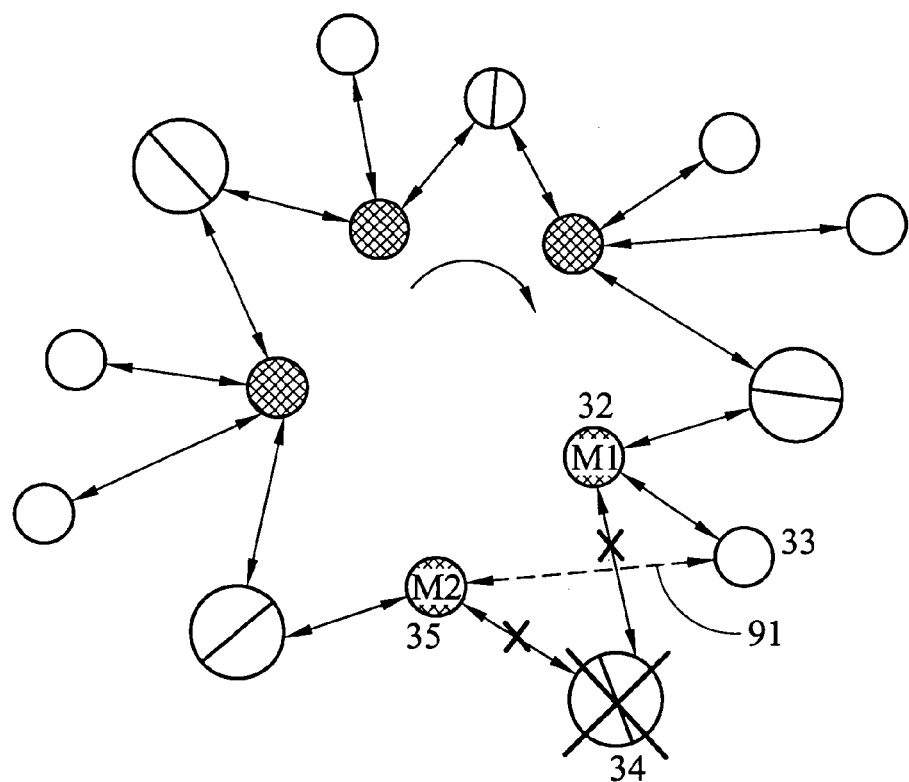
FIGS. 9a and 9b are schematic views of the recovery operation in a bridge leaving according to an embodiment of the present invention.
Figure 9B:
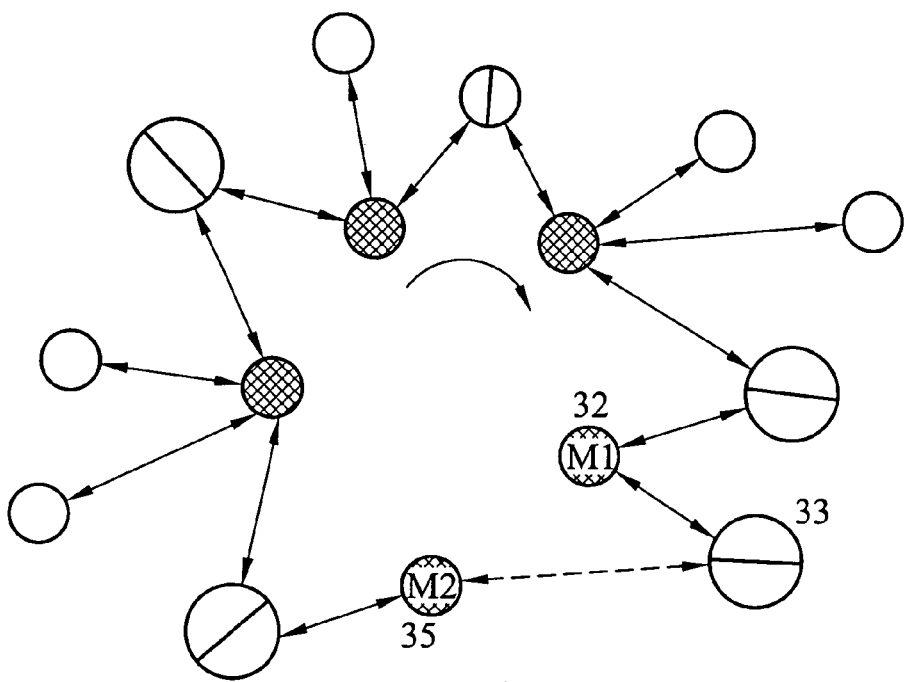

FIGS. 9a and 9b are schematic views of the recovery operation in a bridge leaving. Using FIG. 2 as a reference, the node 32 (master M1) connects with the slave node 33 and the bridge node 34, which connects with the master M1 and the master M2. When the bridge node 34 leaves the network, its upstream master M1 chooses the non-bridge slave node 33 as a new downstream bridge and commands it to perform DIAC 1 inquiry scan 91. In addition, the downstream master M2 performs a DIAC 1 inquiry to search for an upstream bridge and establish a connection with the new upstream bridge. The slave node 33 and the master M2 establish a connection by the DIAC 1 inquiry scan and inquiry operation. If the upstream master M1 has no non-bridge slave other than the bridge node 34, then it tears down the piconet and relieves itself from the master role. All members of the piconet M1, including the ex-master node 32, wait to be discovered by other masters. The procedure to deal with the case of master leaving is detailed below.

Figure 10A:
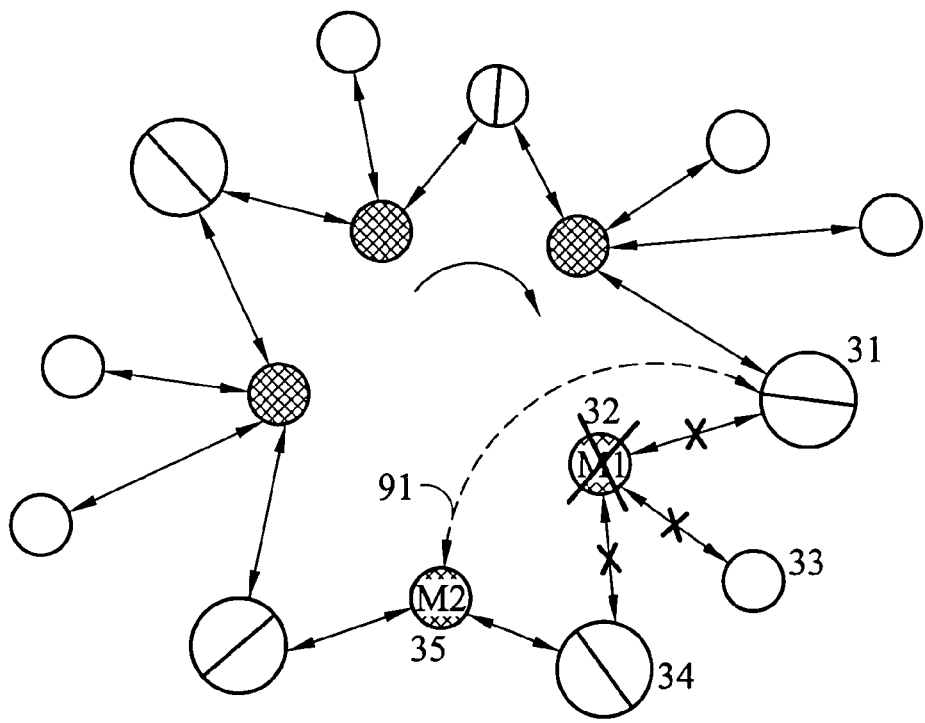
FIGS. 10a and 10b are schematic views of the recovery operation in a master leaving according to an embodiment of the present invention.
Figure 10B:
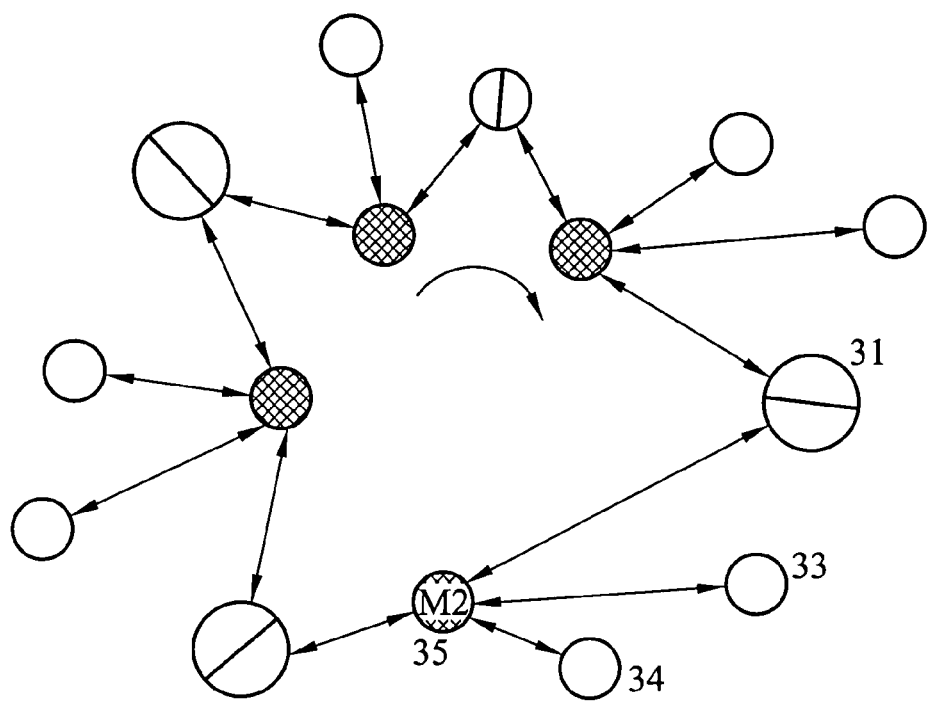

FIGS. 10a and 10b are schematic views of the recovery operation in a master leaving. When a master leaves, all of its slaves, except the downstream and upstream bridges, become orphan devices. Using FIG. 2 as a reference, the node 32 (master M1) connects with the slave node 33, the bridge node 34, and the bridge node 31. The node 35 (master M2) connects with bridge the node 34. The bridge node 34 links the master M1 and the master M2. The bridge 31 links the master M1 and another master device. When the master node 32 leaves the network, its downstream bridge 34 is relieved of its duty as a downstream bridge and instructs the downstream master M2 to perform DIAC 1 inquiry. The node 31 (upstream bridge of master M1) starts DIAC 1 inquiry scan and is discovered by the master M2. The node 31 is assigned as a new upstream bridge of the master M2. The node 33 is discovered by the master M2 by GIAC inquiry/inquiry scan and becomes a slave of the master M2. The network is amended by the above procedures to form a complete ring.

The scatternet ring is extended by creating more piconet through piconet splitting. When the number of slaves exceeds a predetermined value, the piconet is split into two. The maximum number of slaves per piconet ($\alpha$) is determined according to circumstances and is not less than 4. When the number of slaves in a piconet reaches $\alpha$, the master of the piconet sends split request messages to other masters in the scatternet ring to obtain split permission. This procedure is described below.

Figure 11A:
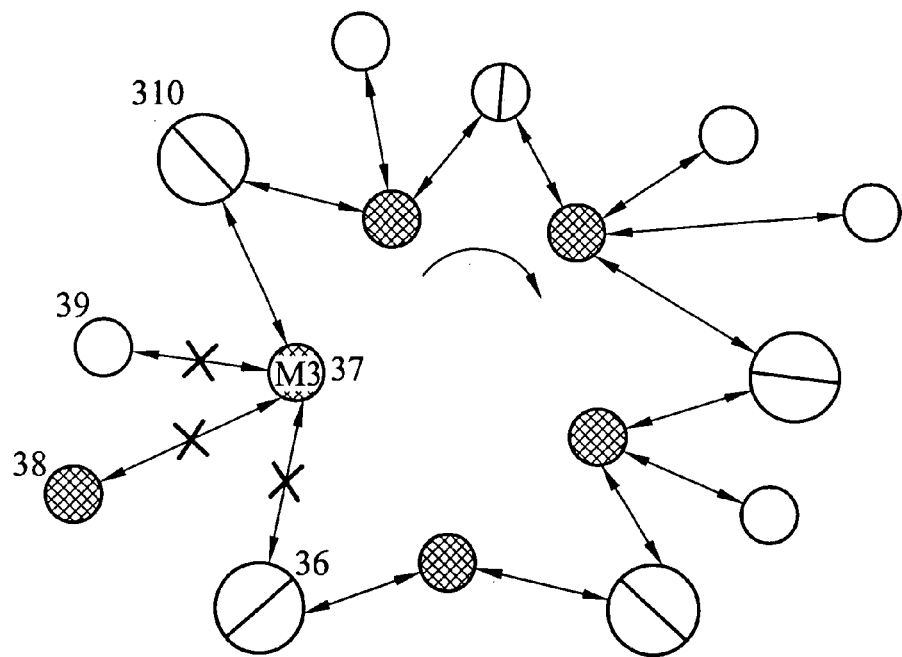
FIGS. 11a to 11c are schematic views of the piconet splitting operation according to an embodiment of the present invention.
Figure 11B:
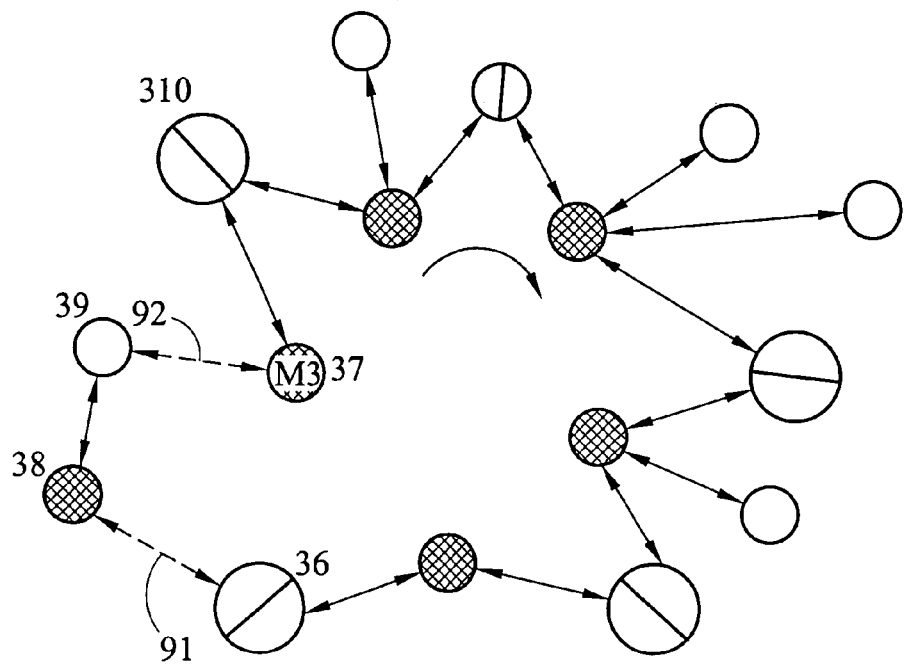
Figure 11C:
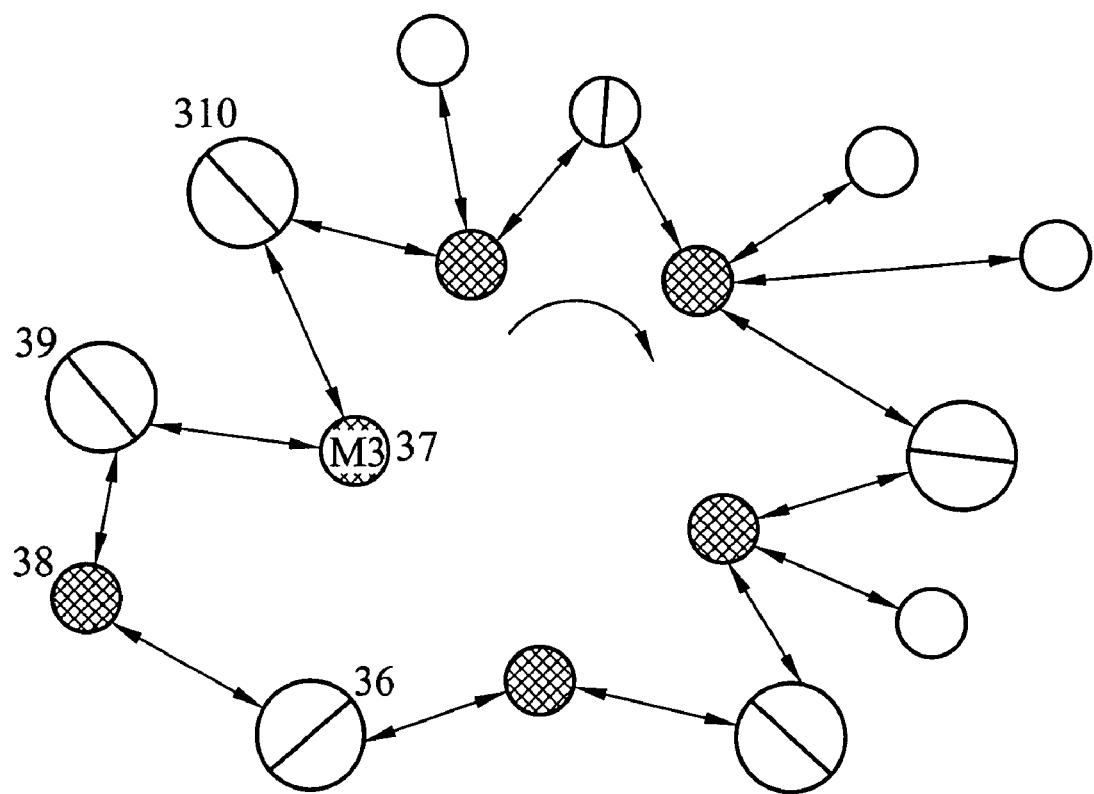

FIGS. 11a to 11c are schematic views of the piconet splitting operation according to an embodiment of the present invention. In this embodiment, $\alpha$ value is set to 4. Using FIG. 2 as a reference, the node 37 (master M3) links to the bridge node 36, the slave node 38, the slave node 39 and the bridge node 310. The bridge nodes 36 and 310 connect to the upstream and downstream piconets of the master M3 respectively. The slave number of the master M3 is 4 and reaches the maximum number, thus the corresponding piconet is determined to split into two. The master M3 sends a split request message to other masters in the scatternet ring. The split request message obtains split permission from other masters and ensures that no piconet splitting is taking place in the scatternet ring concurrently. As shown in FIGS. 11a to 11c, if the split request is approved by all masters in the piconet, the master M3 disconnects from its upstream bridge (node 36) and non-bridge slave nodes 38 and 39. Then master M3 starts DIAC 2 inquiry. When the upstream bridge (node 36) discovers the absence of its downstream master (master M3), it starts DIAC 1 inquiry scan to search for a new downstream master. The node 38 is designated as a new master and provided with the information of the node 39. The node 38 uses the provided information to page the node 39, while the node 39 is informed to perform page scan procedure. Thus nodes 38 and 39 establish a new connection and form a new piconet. The node 38 starts DIAC 1 inquiry and finds the node 36 to serve as its upstream bridge. The node 38 designates its only slave node 39 as its downstream bridge and instructs the node 39 to perform DIAC 2 inquiry scan. The node 39 discovers the node 37 (master M3) by the DIAC 2 inquiry scan and connects with the node 37. The ring is now reestablished with one more piconet.

While the invention has been described by way of example and in terms of the preferred embodiments, it is to be understood that the invention is not limited to the disclosed embodiments. To the contrary, it is intended to cover various modifications and similar arrangements (as would be apparent to these skilled in the art). Therefore, the scope of the appended claims should be accorded the broadest interpretation so as to encompass all such modifications and similar arrangements.

What is claimed is:

1. A Bluetooth network processing method, comprising:
   providing a plurality of piconets, each of which comprises a plurality of Bluetooth units, including one master unit and a plurality of slave units, wherein the piconet comprises a master unit, a downstream bridge, and an upstream bridge,
   linking the piconets using the slave units to form a scatternet ring, wherein the slave units act as a bridge to connect the piconets, wherein the piconet linking step uses a centralized formation mechanism to form the scatternet ring, and the scatternet ring is a closed single-ring Bluetooth network connected by a circle of piconets; and
   appending a plurality of control bit fields to a packet payload for routing the packet from its source to its destination, wherein the control bit fields comprise a relay bit field, a dirty bit field, a broadcast bit field, a source address field and a destination address field.

2. The method as claimed in claim 1, wherein the dirty bit field indicates the source of the packet.

3. The method as claimed in claim 1, wherein the broadcast bit field indicates whether the packet is a unicast packet or a broadcast packet.

4. The method as claimed in claim 3, further comprising the step of providing a routing direction in the scatternet ring and a routing protocol to transmit the packet from its source to its destination.

5. The method as claimed in claim 4, further comprising the steps of:
   transmitting a first packet to a first slave unit;
   checking a first relay bit field in the first packet to determine whether the first packet is targeted to a first downstream master of the first slave;
   checking a first dirty bit field in the first packet when the first packet is not targeted to the first downstream master, in order to determine whether the first packet is targeted to the first slave;
   checking a first broadcast bit field in the first packet when the first slave is not a downstream bridge, in order to determine whether the first packet is a broadcast packet;
   receiving the first packet when the first packet is not a broadcast packet;
   duplicating the first packet and setting the first relay bit field to 1 when the first packet is a broadcast packet; and
   receiving one of the first packet duplicates and transmitting another duplicate to the first downstream master.

6. The method as claimed in claim 5, wherein the step of checking the relay bit field further comprises transmitting the first packet to the first downstream master when the first relay bit field has a TRUE value.

7. The method as claimed in claim 5, wherein the step of checking the dirty bit field further comprises the assessing a first upstream master of the first slave as the source of the first Bluetooth packet when the first dirty bit field has a FALSE value.

8. The method as claimed in claim 7, further comprising assessing the first packet as having been relayed and checking the SA field of the first packet to determine the source of the first packet when the first dirty bit field has a TRUE value.

9. The method as claimed in claim 4, further comprising the steps of:
   transmitting a second packet to a first master unit;
   checking a second relay bit field in the second packet to determine whether the second packet is targeted to the first master;
   discarding the second packet when the second packet, which has a TRUE value in its second dirty bit field, is not targeted to the first master and has a source within the current piconet;
   reassigned a TRUE value to the second dirty bit field when the second packet is not targeted to the first master and has a FALSE value in its dirty bit field;
   duplicating the second packet when the second packet is a broadcast packet;
   broadcasting one duplicate to the current piconet and receiving another duplicate;
   receiving the second packet when the second packet is not a broadcast packet and is targeted to the first master;
   determining whether the second packet is targeted to a first destination unit within the current piconet when the second packet is not targeted to the first master;
   transmitting the second packet to the downstream bridge of the first master when the second packet is not targeted to the first destination unit; and
   transmitting the second packet to the first destination unit and reassigning a FALSE value to the second relay bit field in the second packet when the second packet is targeted to the first destination unit.

10. The method as claimed in claim 9, wherein the step of checking the source of the second packet further comprises determining whether the source of the second packet is the first master.

11. The method as claimed in claim 9, wherein the step of resetting the dirty bit is performed to detect orphan packets or excess circulated packets.

12. The method as claimed in claim 9, wherein the discarded packet is an orphan packet or an excess circulated packet.

13. The method as claimed in claim 9, further comprising assessing the second packet as an unicast packet and determining whether the second packet is targeted to transfer when the second packet has a FALSE value in its broadcast bit field.

14. The method as claimed in claim 4, wherein the packet is routed from its source unit to destination unit by single-hop unicasting, multi-hop unicasting, or broadcasting.

15. The method as claimed in claim 14, wherein the single-hop unicasting is used when the source unit links directly with the destination unit within the same piconet.

16. The method as claimed in claim 15, wherein the relay bit is set to 0 when single-hop unicasting is adopted.

17. The method as claimed in claim 14, wherein the multi-hop unicasting is used when the source unit and the destination unit do not connect directly or belong to different piconets.

18. The method as claimed in claim 17, wherein the relay bit is set to 1 when multi-hop unicasting is adopted.

19. The method as claimed in claim 18, wherein the routing is terminated at the master of its destination piconet when multi-hop unicasting is adopted.

20. The method as claimed in claim 14, wherein broadcasting is used when the Bluetooth packet is targeted to all units in the scatternet ring.

21. The method as claimed in claim 20, wherein the relay bit is set to 0 and broadcast over the current piconet when the source of the packet is the master.

22. The method as claimed in claim 21, wherein the downstream bridge of the issuing master assesses the packet as a broadcast packet needing relay by checking the content of the packet, resets the relay bit to 1, and forwards the packet to the downstream master of the downstream bridge.

23. The method as claimed in claim 4, further comprising the steps of:
  detecting the leaving of a third master;
  relieving a third downstream bridge of the third master of its bridge service;
  causing a third downstream master of the third master to perform a DIAC 1 inquiry;
  causing a third upstream bridge of the third master to perform a DIAC 1 inquiry scan;
  establishing connection between the third downstream master and the upstream bridge when the third downstream master discovers the third upstream bridge; and
  establishing connection between the third downstream master and at least one master-free unit discovered by the third downstream master through the GIAC inquiry scan.

24. The method as claimed in claim 4, further comprising the steps of:
  detecting the leaving of a fourth bridge;
  causing a fourth downstream master of the fourth bridge to perform a DIAC 1 inquiry;
  designating a non-bridge slave of a fourth upstream master of the fourth bridge for a fifth downstream bridge; and
  causing the fifth downstream bridge to perform a DIAC 1 inquiry scan to be discovered by the fourth downstream master as a new upstream bridge.

25. The method as claimed in claim 24, further comprising relieving the fourth upstream master of its master service and causing the fourth upstream master to perform a GIAC inquiry scan to be discovered by a master when the fourth upstream master has no non-bridge slave.

26. The method as claimed in claim 4, further comprising providing an extension mechanism to split the piconet when the number of slaves in the piconet exceeds a critical value, wherein the extension mechanism takes advantage of the GIAC, the DIAC 1, and the DIAC 2.

27. The method as claimed in claim 26, further comprising:
  adding a unit to a sixth piconet in the scatternet ring, wherein the sixth piconet comprises a sixth master, a sixth upstream bridge, a sixth downstream bridge, a seventh slave, and an eighth slave;
  determining to split the sixth piconet when the sixth piconet has more slaves than a critical number;
  transmitting a split request message from the sixth master to other masters in the scatternet ring;
  breaking the connection between the sixth master and the sixth upstream bridge, the seventh slave, and the eighth slave respectively, and performing the DIAC 2 inquiry;
  causing the sixth upstream bridge to perform the DIAC 1 inquiry scan when it detects the leaving with the sixth master;
  designating the seventh slave for a seventh master of a newly forming seventh piconet;
  designating the eighth slave for an eighth downstream bridge of the seventh master;
  causing the seventh master to perform the DIAC 1 inquiry to discover the sixth upstream bridge; and
  causing the eighth downstream bridge to perform the DIAC 2 inquiry scan to establish connection with the sixth downstream bridge.

28. The method as claimed in claim 27, wherein the split request message issued by the sixth master is routed throughout the scatternet ring to obtain split permission from other masters in the scatternet ring.

29. A Bluetooth network system, comprising a plurality of piconets arranged in a circle, wherein each of the piconet comprises a plurality of Bluetooth units, including one master unit and a plurality of slave units linking the piconets to form a scatternet ring, wherein the slave units act as a bridge to connect the piconets, and the piconet comprises a master unit, a downstream bridge, and an upstream bridge,
  wherein the scatternet ring is formed by a centralized formation mechanism, and the scatternet ring is a closed single-ring Bluetooth network connected by a circle of piconets, and
  wherein a packet conveying data between units has a payload with a relay bit field, a dirty bit field, a broadcast bit field, a source address field and a destination address field.

30. The Bluetooth network system as claimed in claim 29, wherein the dirty bit field indicates the source of the packet.

31. The Bluetooth network system as claimed in claim 29, wherein the broadcast bit field indicates whether the packet is a unicast packet or a broadcast packet.

32. The Bluetooth network system as claimed in claim 31, wherein the scatternet ring has a direction for routing packets.

33. The Bluetooth network system as claimed in claim 32, wherein a first slave unit receives a first packet, checks a first relay bit field in the first packet to determine whether the first packet is targeted to a first downstream master of the first slave, checks a first dirty bit field in the first packet if the first packet is not targeted to the first downstream master, in order to determine whether the first packet is targeted to the first slave, checks a first broadcast bit field in the first packet if the first slave is not a downstream bridge, in order to determine the first packet is a broadcast packet, receives the first packet when the first packet is not a broadcast packet, duplicates the first packet and sets the first relay bit field to 1 when the first packet is a broadcast packet, receives one of the first Bluetooth packet duplicates, and transmits another duplicate to the first downstream master.

34. The Bluetooth network system as claimed in claim 32, wherein a first master unit receives a second packet, checks a second relay bit field in the second packet to determine whether the second packet is targeted to the first master, discards the second packet if the second packet having a TRUE value in its second dirty bit field is not targeted to the first master and has a source within the current piconet, reassigns a TRUE value to the second dirty bit field if the second packet is not targeted to the first master and has a FALSE value in its dirty bit field, duplicates the second packet when the second packet is a broadcast packet, broadcasts one duplicate to the current piconet and receives another duplicate, receives the second packet if the second packet is not a broadcast packet and is targeted to the first master, determines whether the second packet is targeted to a first destination unit within the current piconet if the second packet is not targeted to the first master, transmits the second packet to the downstream bridge of the first master when the second packet is not targeted to the first destination unit, and transmits the second packet to the first destination unit and reassigned a FALSE value to the second relay bit field in the second packet when the second packet is targeted to the first destination unit.

35. The Bluetooth network system as claimed in claim 32, wherein the packets are routed from source unit to destination unit by single-hop unicasting, multi-hop unicasting, or broadcasting.

36. The Bluetooth network system as claimed in claim 35, wherein the single-hop unicasting is used when the source unit links directly with a destination unit within the same piconet.

37. The Bluetooth network system as claimed in claim 35, wherein multi-hop unicasting is used when the source unit and the destination unit do not connect directly or belong to different piconets.

38. The Bluetooth network system as claimed in claim 35, wherein broadcasting is used when the packet is targeted to all units in the scatternet ring.

39. The Bluetooth network system as claimed in claim 32, wherein scatternet rings broken by a failure of a master or a bridge are reconnected by a recovery mechanism using a GIAC, a DIAC 1, and a DIAC 2.

40. The Bluetooth network system as claimed in claim 39, wherein a third master disconnects and causes a third downstream bridge to become a non-bridge slave, a third downstream master performs a DIAC 1 inquiry, a third upstream bridge of the third master performs a DIAC 1 inquiry scan, the third downstream master discovers the third upstream bridge and establishes connection therewith, and the third downstream master links with at least one master-free unit discovered by the third downstream master through the GIAC inquiry scan.

41. The Bluetooth network system as claimed in claim 39, wherein a fourth bridge disconnects and causes a fourth downstream master of the fourth bridge to perform a DIAC 1 inquiry, a non-bridge slave of a fourth upstream master of the fourth bridge is designated for a fifth downstream bridge, and the fifth downstream bridge performs a DIAC 1 inquiry scan to be discovered by the fourth downstream master as a new upstream bridge.

42. The Bluetooth network system as claimed in claim 41, wherein the fourth upstream master becomes a non-master unit and performs a GIAC inquiry scan to be discovered by a master when the fourth upstream master has no non-bridge slave.

43. The Bluetooth network system as claimed in claim 39, wherein any piconet with more slaves than a critical number is split by an extension mechanism using a GIAC, a DIAC 1, and a DIAC 2.

44. The Bluetooth network system as claimed in claim 43, wherein a sixth piconet comprises a sixth master, a sixth upstream bridge, a sixth downstream bridge, a seventh slave, and an eighth slave, and the sixth piconet splits when the number of slaves of the sixth piconet exceeds a critical value, and the sixth master transmits a split request message to other masters in the scatternet ring, the sixth master breaks the connection with the sixth upstream bridge, the seventh slave, and the eighth slave respectively and performs the DIAC 2 inquiry, the sixth upstream bridge performs the DIAC 1 inquiry scan when it detects the leaving with the sixth master, the seventh slave is designated as a seventh master of a newly formed seventh piconet and performs the DIAC 1 inquiry to discover the sixth upstream bridge, the eighth slave is designated for an eighth downstream bridge of the seventh master and performs the DIAC 2 inquiry scan to establish connection with the sixth downstream bridge.

45. The Bluetooth network system as claimed in claim 44, wherein the split request message issued by the sixth master is routed throughout the scatternet ring to obtain split permission from other masters.

* * * * *